United States Patent [19]

Womack

[11] Patent Number: 4,505,876
[45] Date of Patent: Mar. 19, 1985

[54] NUCLEAR HEATED AND POWERED METAL EXCIMER LASER

[75] Inventor: Dennis R. Womack, Knoxville, Tenn.

[73] Assignee: The United States of America as represented by the Secretary of the Army, Washington, D.C.

[21] Appl. No.: 347,753

[22] Filed: Feb. 11, 1982

[51] Int. Cl.³ .......................... G21C 15/02; H01S 3/09
[52] U.S. Cl. ..................... 376/326; 376/321; 376/367; 372/56; 372/57
[58] Field of Search ............ 376/321, 326, 367; 372/56, 57, 73, 109

[56] References Cited

U.S. PATENT DOCUMENTS

| | | | |
|---|---|---|---|
| 3,534,202 | 10/1970 | Schutt | 376/321 |
| 3,558,935 | 1/1971 | Gritton et al. | 376/321 |
| 3,559,095 | 1/1971 | Nielson | 376/326 |
| 3,613,773 | 10/1971 | Hall et al. | 376/321 |
| 3,917,509 | 11/1975 | Fisher et al. | 376/321 |
| 4,160,956 | 7/1979 | Fader | 376/326 |

OTHER PUBLICATIONS

ANS Transactions (12/77), p. 928, Carter et al.
S 5745 00 34, Sov. Phys., No. 3 (1974), pp. 12–13, Gudzenko.
Patent Application 165,924 (7/3/80), Miller, Uranium--Eximer Nuclear Reactor Laser.
"A Nuclear Electronic Propulsion Vehicle for Planetary Exploration", J. Spacecraft, vol. 14, No. 9, pp. 518–525.
"Heat Pipe Copper Vapor Laser", R. J. L. Chimenti AD/A-005, 004, Exxon Research & Engineering Company.

Primary Examiner—Sal Cangialosi
Attorney, Agent, or Firm—Anthony T. Lane; Robert P. Gibson; Harold W. Hilton

[57] ABSTRACT

A laser using heat and thermionic electrical output from a nuclear reactor in which heat generated by the reactor is utilized to vaporize metal lasants. Voltage output from a thermionic converter is used to create an electric discharge in the metal vapors. In one embodiment the laser vapors are excited by a discharge only. The second embodiment utilizes fission coatings on the inside of heat pipes, in which fission fragment excitation and ionization is employed in addition to a discharge. Both embodiments provide efficient laser systems that are capable of many years of operation without servicing. Metal excimers are the most efficient electronic transition lasers known with output in the visible wavelengths. Use of metal excimers, in addition to their efficiency and wavelengths, allows utilization of reactor waste heat which plagues many nuclear pumped laser concepts.

5 Claims, 8 Drawing Figures

NUCLEAR HEATED AND POWERED METAL EXCIMER LASER

DEDICATORY CLAUSE

The invention described herein may be manufactured, used, and licensed by or for the Government for governmental purposes without the payment to me of any royalties thereon.

BACKGROUND OF THE INVENTION

Nuclear energy is the most compact form of energy known. Efficient methods of using nuclear energy to pump lasers are continuously being sought, but no one method proposed to date has been accepted as desirable or feasible. One feature a nuclear laser must have is a critical reactor assembly used in a manner other than a neutron source only, otherwise its potential is wasted. A reactor assembly, however, generates heat. This heat can degrade, even terminate laser output. Concepts using nuclear reactors generally envision the reactor operated in a pulsed mode, or the laser gas flowing and passing through coolant loops, to avoid the problem of reactor heat.

Metal excimers require heat to produce a vapor state in the metals. Output in many of the excimers has been limited in power in part due to the low atom densities achievable with the oven temperatures used to heat the metal ($\sim 1000°$ K.) Nuclear reactors can be designed which generate temperatures much higher than conventional r-f or induction heated ovens, without requiring electrical input.

The Nuclear Energy Propulsion (NEP) vehicle utilizing Thermionic Energy (TEC) is such a reactor design. Such systems are disclosed by Eugene V. Pawlik and Wayne M. Phillips, "A Nuclear Electric Propulsion Vehicle for Planetary Exploration", J. Spacecraft Vol. 14, No. 9, pgs 518–525. The fuel in such systems is cooled by heat pipes, which operate at temperatures of 1650° K.

Applicant's invention utilizes such a reactor in conjunction with thermionic converters which use the temperature to generate a DC voltage. The voltage is discharged in the heat pipes to vaporize metal lasants therein.

Such nuclear reactors could be changed to incorporate the principle of direct nuclear pumping (DNP). Fission coatings may be added to the inside of the heat pipes, or all of the fuel may be replaced with fission coatings. Then, in addition to an electric discharge, fission fragments are used to excite and ionize the metal vapors. Excitation and ionization by fission fragments increases the electrical efficiency of the metal vapor lasers.

Metal excimer lasers, such as HgCl* or HgCd*, are efficient lasers which radiate in the visible wavelengths. The use of nucelar reactors to provide an electric discharge and to vaporize the metals can demonstrate high total efficiency. High power lasers for laser isotope separation, inertial fusion, space based power plants, communications or beam weapons can be fielded which operate for many years unattended.

SUMMARY OF THE INVENTION

A nuclear heated and powered metal excimer laser in which heat generated by reactor fuel is used to vaporize the metal lasants. Excess heat is carried away by heat pipes with thermionic converters incorporated on them. The temperature of the heat pipe is used by the thermionic device to create a DC voltage. The voltage is stored and pulsed to electrodes in the fuel region, of the heat pipe, causing lasing in the metal vapors. Reactor design includes a plurality of fuel clusters with associated heat pipe, yielding the same number of laser beams in the visible region of the spectrum. The laser beams are focused and aimed, separately or independently, in an optics system. High power beams are generated in nuclear systems having long lifetimes and high reliability.

DETAILED DESCRIPTION OF THE INVENTION

Figure 1:
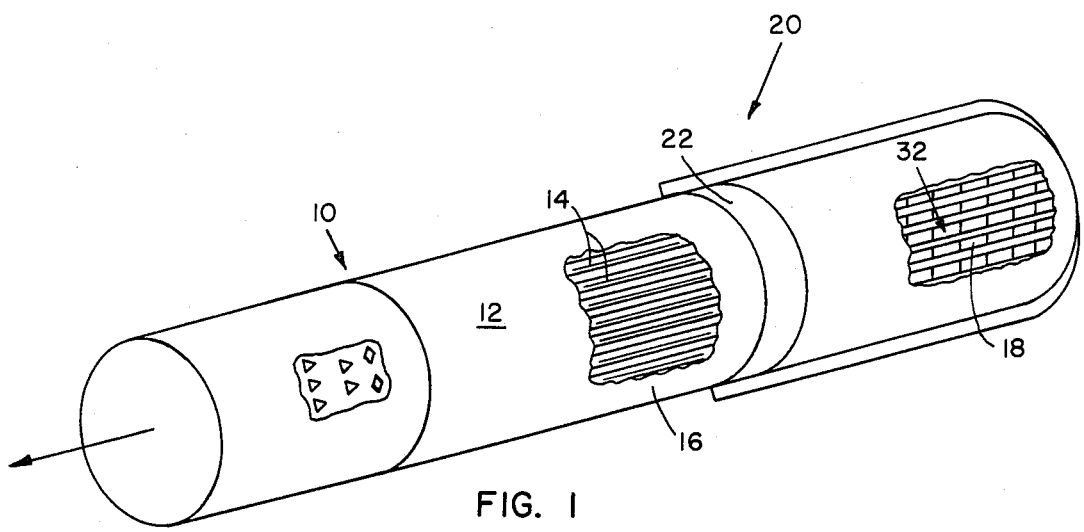
FIG. 1 is a partially cut-away pictorial view illustrating the relationship of the nuclear reactor, thermionic converters and beam focusing device of the laser of the present invention.
Figure 2:
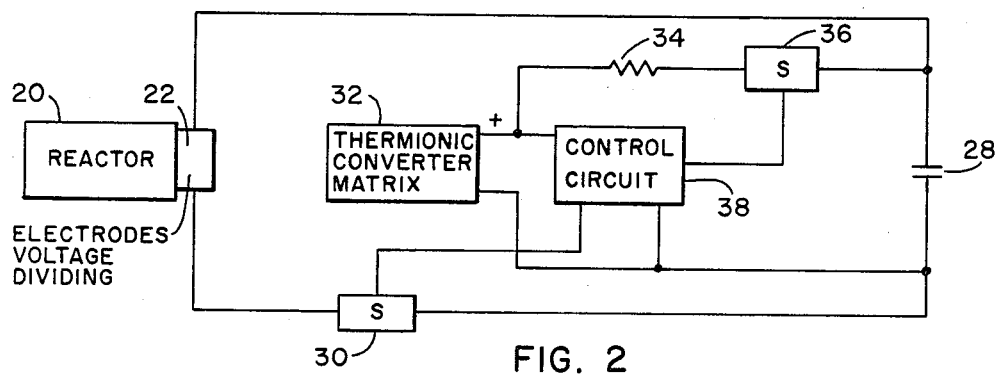
FIG. 2 is a schematic drawing of the discharge circuit for excitation of the metal vapors in the laser of the present invention.

As seen in FIG. 1, a nuclear heated and powered metal excimer laser 10 includes a reactor 12 having fuel therein which is conduction cooled by molybdenum heat pipes 14, one pipe per fuel cluster. The heat pipe extends out of the core region 16, and has termionic converters 18 connected in series at the end 20 of the reactor. Thermionic conversion of heat to electricity provides a low DC voltage which can be stored in a plurality of capicators (FIG. 2 illustrates a typical single capacitor charging circuit). These capacitors are pulsed to provide an electric discharge. The discharge is fed to the core region by electrodes that extend through section 22 of the reactor and into the interior of the heat pipe. The interior of the heat pipe contains metal, now vaporized by the high temperatures, and is made to lase via excimer formation by the discharge. Each heat pipe is a metal excimer laser and the many small beams are focused and aimed in an optics assembly 24.

As seen in FIG. 2, a typical capacitor 28 is connected to the reactor through a switch 30. Each capacitor 28 is charged by its corresponding thermionic converter in matrix 32 through resistor 34 and switch 36. Control circuit 38 controls switches 30 and 36 such that when the capacitor is charging switch 30 is closed and switch 36 is open. When the capacitor 28 is to supply the reactor 20, switch 36 is closed and switch 30 is open. Any well known control circuit may be used. The energy stored in the capacitors may be connected in series to increase the voltage before supplying the reactor. Such control circuits and parallel series circuits are well known in the art.

Figure 3:
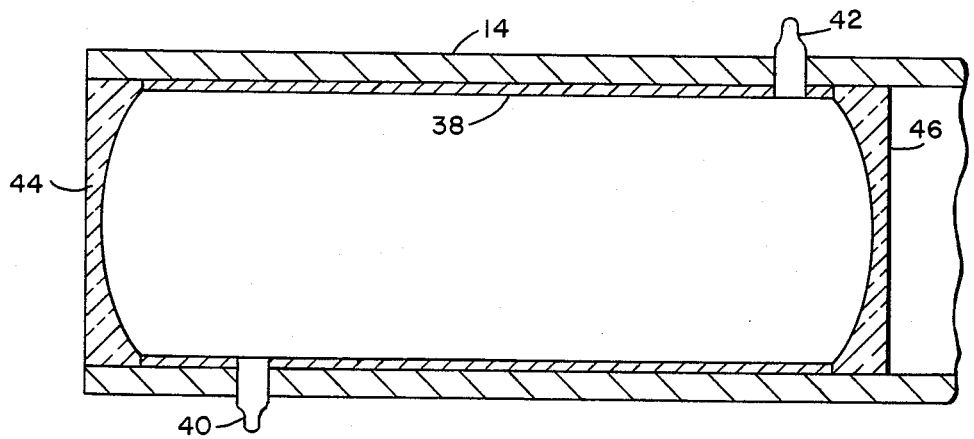
FIG. 3 is a sectional view illustrating a laser-cavity havin fission foil therein for fission.

As seen in FIG. 3, a single fuel element includes a fission coating 38 on the inside of the heat pipe 14. A pair of electrodes 40 and 42, and a pair of end mirrors 44 and 46 are secured to heat pipe 14. Electrodes 40 and 42 are connected to the thermionic converters as illustrated in FIG. 2. In many design configurations of reactors, the nuclear fuel is a Mo/UO$_2$ cermet and is chemically and mechanically compatible with the Mo heat pipe. If desired, thin coating of Mo/UO$_2$ could be bonded to the inside of the heat pipe. This is an advantage when using the heat pipe as a laser cavity in that fission fragments will escape the coating and enter the vapors. The heavy, high energy fragments will ionize and excite the vapor helping to stabilize the electric discharge, if not actually direct nuclear pumping the vapors. The heat pipes can comfortably operate at temperatures up to 1650° K., with past designs calling for temperatures up to 2000° K. These temperatures far surpass those achievable in conventional ovens used in research to date, making possible higher atom densities of metal vapors and, therefore, possibly increasing the gain and extractable power of the metal excimer.

Figure 4:
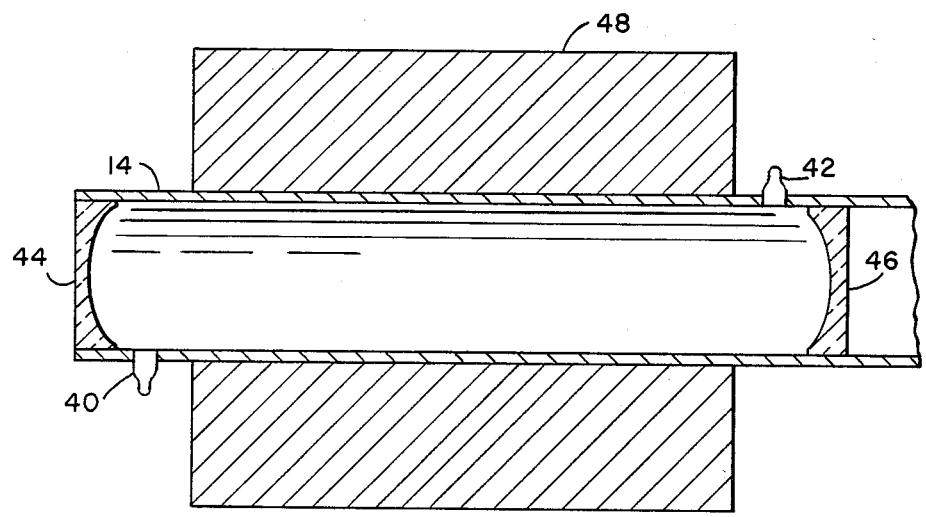
FIG. 4 is a sectional view of a laser cavity having the fuel outside the heat pipe.

FIG. 4 depicts a unit fuel cell 14 having electrodes 40 and 42 and end mirrors 44 and 46 thereon. Mo/UO$_2$ cermet 48 is bonded in hexagonal Mo clad, and the heat pipe is bonded in the center of this fuel cluster. The heat pipe cools the fuel by conduction and is cooled in turn by flowing lithium. If fission coatings on the inside of the heat pipe (FIG. 3) proves undesirable, this traditional fuel element could be used to vaporize the metal lasants. A discharge pumps the excimers but no ionization or excitation from fission fragments can occur in this element (except as explained herein below).

Figure 5:
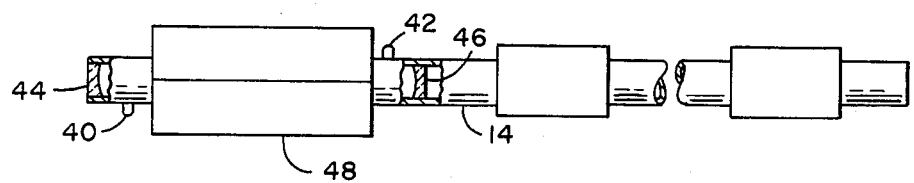
FIG. 5 is an elevational view of the heat pipe and fuel assembly of FIG. 4 having thermionic converters associated therewith.
Figure 6:
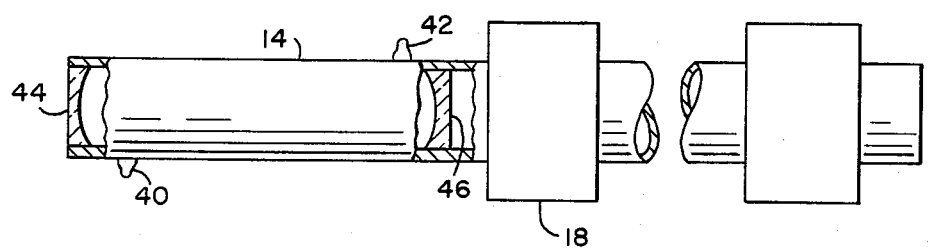
FIG. 6 is an elevational diagrammatic view of the heat pipe and fuel assembly of FIG. 3 having thermionic converters associated therewith.

FIGS. 5 and 6 depict how the thermionic converters 18 are arranged with the fuel 38 and 48 and heat pipe 14 of the devices of FIGS. 3 and 4, respectively. Some reactors will deliver 500 kWe which can be used for a discharge, such as a pulsed discharge to deliver greater power.

Figure 7:
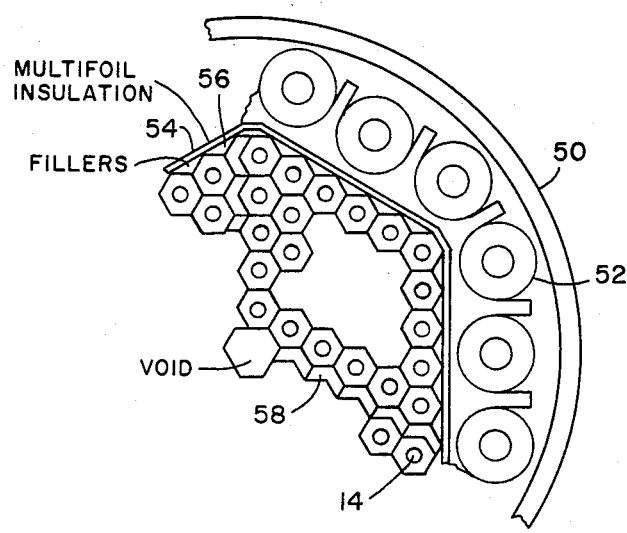
FIG. 7 is a partially sectional view of a reactor with unit cells of Mo-UO$_2$ cermet fuel.

A part of the core of the NEP type reactor discussed herein is shown in FIG. 7.

The reactor is shown in FIG. 3 of the J. Spacecraft article by Eugene V. Pawlik and Wayne M. Phillips, discussed hereinabove. The reactor includes a ring frame 50 enclosing control drums 52 which surround a multifoil insulating member 54 and a segmented load ring 56. A plurality of heat pipes 14 having spacers 58 therebetween. This particular design has 90 fuel elements, therefore 90 metal excimer lasers. Other possible designs have 80, 114, 154, or 200 fuel elements and pipes. The smaller the heat pipe the more are required. The pipes vary in diameter from 2.85 cm when 80 pipes are used to 1.8 cm when 200 pipes are used. These diameters affect the reactor diameter more than the reactor criticality, so larger pipes may be possible, especially if reactivity is added in the form of Mo/UO$_2$ coatings to the heat pipes. A core assembly of the fission coated fuel elements of FIG. 3 would be much like that of FIG. 7, but less fuel would be required outside of the heat pipes.

Figure 8:
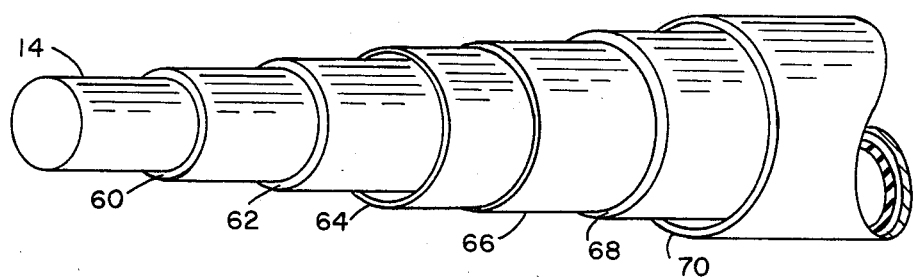
FIG. 8 is a diagrammatic view of the thermionic converter components as used in the reactor systems of the present invention.

FIG. 8 illustrates the components of the thermionic converters. As seen in FIG. 8, the heat pipe 14 is enclosed by an emitter insulator 60 and emitter 62. A gap 64 separates collector 66 from the emitter 62. An insulator 68 is provided around collector 66 and a coolant passage 70 serves to pass coolant around the assembly.

One method of fission fragment augmentation that could be used in both fuel element designs would be to add UCl$_5$ to the metal vapors. The fission fragments would then be created uniformly in the lasant, heating of the metals would become more uniform and reactivity could be added to the reactor reducing fueling requirements or allowing larger heat pipes. Addition of UCl$_5$ would be further attractive if the HgCl* excimer were the lasant in the heat pipes. HgCl has lased at 600° K., may sustain long pulse operation, and has demonstrated the possibility of yielding several joules per liter at visible wavelengths. One method of forming HgCl excimer is the recombination of Hg$^+$ and Cl$^-$ ions, which makes ionization by fission fragments attractive.

Another promising metal excimer for use in the reactor/laser is HgCd*. This excimer lases at 4700° A and has long lifetimes. This metal vapor system exhibits higher powers the higher the atom densities of the metals, thereby favoring high temperatures.

Other metal excimer candidates are HgTl*, HgIn*, CdTl*, CdIn*, ZnIn*, ZnTl*, and other Hg-halides. Also, Hg$_2$ is a possible excited dimer reaction with a long lifetime, and Hg has already been direct nuclear pumped.

I claim:

1. A nuclear heated and powered metal excimer laser comprising:
   a. a nuclear reactor including a housing having a core region and a plurality of heat pipes therein, the distal end of each said heat pipes extending out of said core region;
   b. thermionic converter means connected to said distal ends of each said heat pipe to provide thermionic conversion of heat to electricity;
   c. metal excimer means carried in said heat pipes for vaporization by heat in said reactor core;
   d. electrode means secured in the reactor core region of said heat pipes;
   e. circuit means disposed between said thermionic converter means and said electrode means for storing and pulsing electricity from said thermionic converters to said electrode means, to provide an electric discharge in the vaporized metal excimer means to create a laser beam; and
   f. beam focusing means carried in said reactor to focus and direct said laser beam formed in said heat pipes as a result of said electrodes being energized.

2. Apparatus as in claim 1 wherein said thermionic converters are placed in a matrix at said distal ends of said heat pipes.

3. Apparatus as in claim 2 including voltage dividing electrodes connected between said heat pipe electrodes and said thermionic converter matrix.

4. Apparatus as in claim 3 wherein said heat pipes are provided with fission foil material therein.

5. Apparatus as in claim 3 wherein said heat pipe is provided with a Mo-UO$_2$ cermet clad therearound.

* * * * *